April 27, 1948.  D. CROPP  2,440,366
MOLDING MACHINE
Filed July 13, 1945  3 Sheets-Sheet 1

Inventor
David Cropp
By Richmond S. Hayes
Attorney

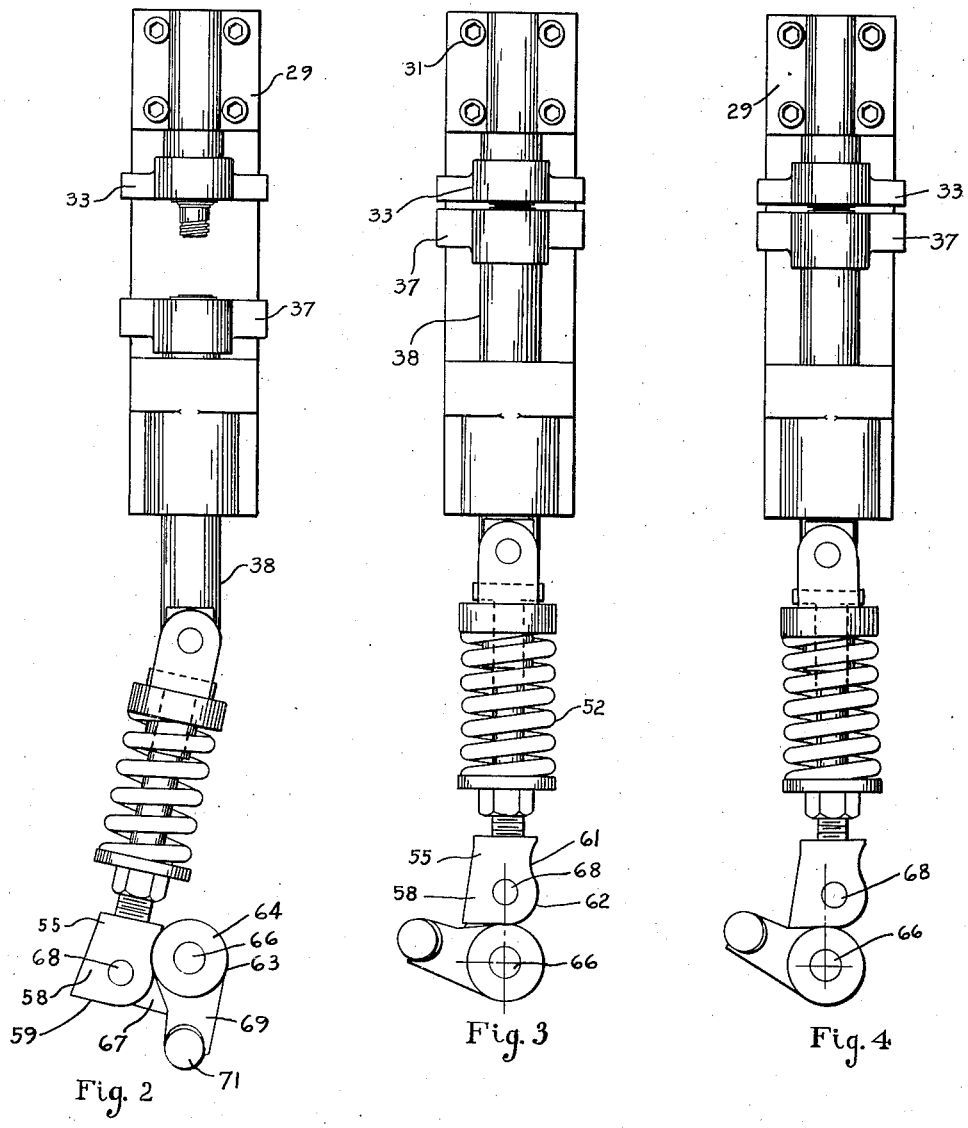

April 27, 1948.　　　　　　D. CROPP　　　　　　2,440,366
MOLDING MACHINE
Filed July 13, 1945　　　3 Sheets-Sheet 3
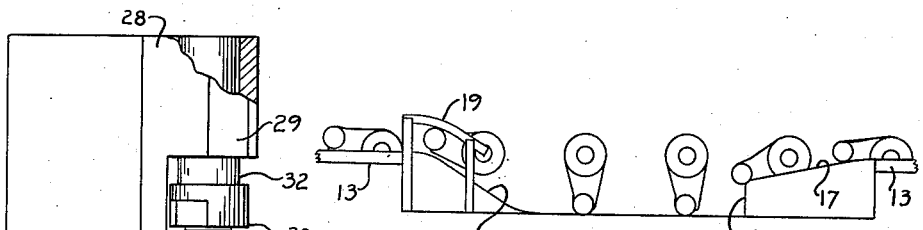
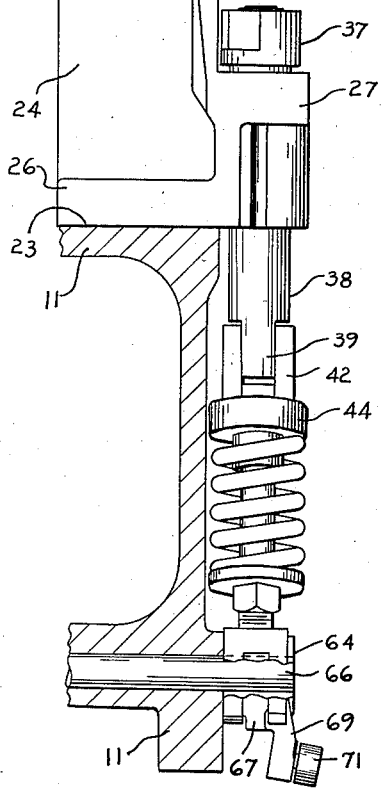
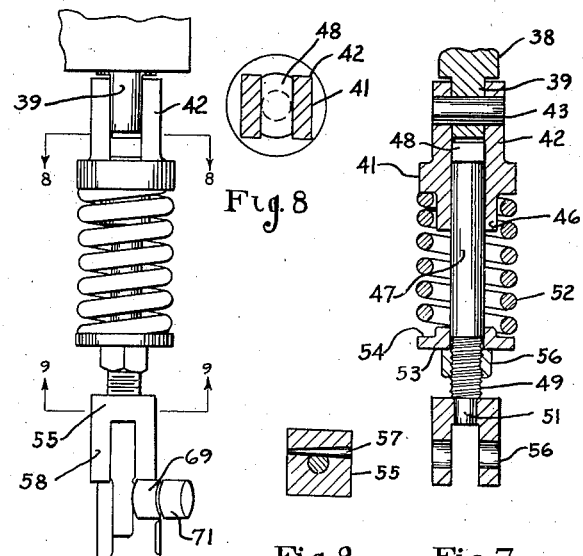
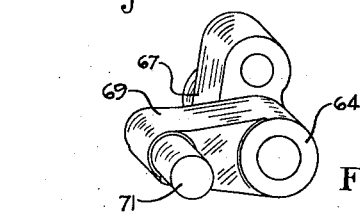
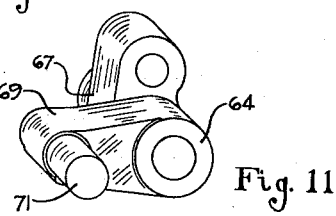
Inventor
David Cropp
By Richmond A. Hayes
Attorney Patented Apr. 27, 1948

2,440,366

UNITED STATES PATENT OFFICE 2,440,366

MOLDING MACHINE

David Cropp, Rochester, N. Y., assignor to Cropp Engineering Corporation, Warren, Pa., a corporation of Delaware Application July 13, 1945, Serial No. 604,762

8 Claims. (Cl. 18—20)

This invention relates to improvements in a machine for compression molding articles from plastic materials, and particularly to a machine of the turret type adapted for automatic sequential operation.

To properly mold a piece from plastic material it is primarily only necessary to properly fill the mold cavity, close the mold elements one upon the other, and hold them in such position under pressure for a given period of time during which heat is applied. Following this operation, the mold elements are separated and the finished piece removed. In the automatic sequential molding of pieces from plastic material, a machine of a somewhat complicated nature is required; that is, the machine must not only automatically feed the required plastic pellets, or powder, to the mold cavities as they are successively presented, but must successively complete the molding cycle for each set of mold elements and, upon completion, separate these elements and eject the molded pieces.

Of the many machines developed for automatic sequential molding, insufficient development and design attention has been given to that portion of the mechanism by which the mold elements are moved into and out of closed position and are held under a given pressure during a molding cycle. The mechanisms for this purpose have been operated or held in operative position by means that may be considered impositive or impermanent to the extent that the pressure applied to the mold elements might vary not only during the molding cycle of a given piece, but during the molding cycle of one piece with respect to another. Of course this could only result in either producing imperfectly molded pieces, or lack of uniformity of one molded piece with respect to another. It will, of course, be understood that reference is not made to pressure maintaining mechanisms in structures that are infrequently used, or whose cycle of operation is slow but, rather, to mechanisms for automatic sequential machines wherein the molding cycle is comparatively short and the mechanism is required to function rapidly and accurately over long periods of time without possibility of breakdown or such wear to the parts as would render them incapable of their proper function.

It is a purpose and object of the present invention, therefore, to provide mechanism, in an automatic sequential turret molding machine, that effects the closing and opening of the mold elements and maintains these elements under predetermined pressure during a molding cycle.

It is also an object of the invention to provide a mechanism which utilizes a positive, extremely rugged, and simple means for not only moving the mold elements into and out of closed position, but for maintaining these elements under desired predetermined pressure during molding cycles.

It is a further object of the invention to provide a mechanism which functions to initially, quickly bring the mold elements into a relationship such that the plastic material will be forced into its proper place and subsequently effect and maintain desired pressure of the mold elements throughout a molding cycle.

It is a still further object of the invention to provide a mechanism which, upon the completion of a molding cycle, will quickly and easily separate the elements of the mold preparatory to the ejection of a molded piece.

It is a further and important object of the invention to provide a mechanism of such construction that it not only may be depended upon to successively apply a predetermined pressure to the mold elements during a molding cycle, but may be readily adjusted to change the pressure when using a different plastic material, or changing from the molding of one size of piece to another.

Other objects and advantages of the invention will be more fully understood and appreciated from a consideration of the following specification, taken in conjunction with the accompanying drawings; and in which Fig. 1 is a fragmentary front elevational view of an automatic sequential turret type molding machine embodying one form of the invention and, for purposes of illustration, shows several of the molding units in various opened or closed positions;

Fig. 2 is a front elevational view of one of the several molding units shown in Fig. 1, the elements of the mold being in fully opened position;

Fig. 3 is a front elevational view of the unit shown in Fig. 2 and illustrates the closed position of the mold elements when first moved into such position by an associated actuating mechanism;

Fig. 4 is a further front elevational view of a molding unit showing the mold elements latched or secured in closed position at the start of a molding cycle;

Fig. 5 is a side elevational view of one of the molding units with the mold elements in fully opened position (see Fig. 2);

Fig. 6 is a fragmentary side elevational view of the actuating mechanism for the molding elements in the position assumed when these elements are closed (Fig. 4);

Fig. 7 is a fragmentary vertical sectional view of a substantial portion of the structure shown in Fig. 6;

Fig. 8 is a horizontal sectional view taken substantially on the line 8—8 of Fig. 6;

Fig. 9 is a horizontal sectional view taken substantially on the line 9—9 of Fig. 6;

Fig. 10 is a somewhat diagrammatic view showing the means by which the mold actuating mechanism is caused to function; and Fig. 11 is a view of one of the cam actuated members that functions to open and close the mold elements.

Figure 1:
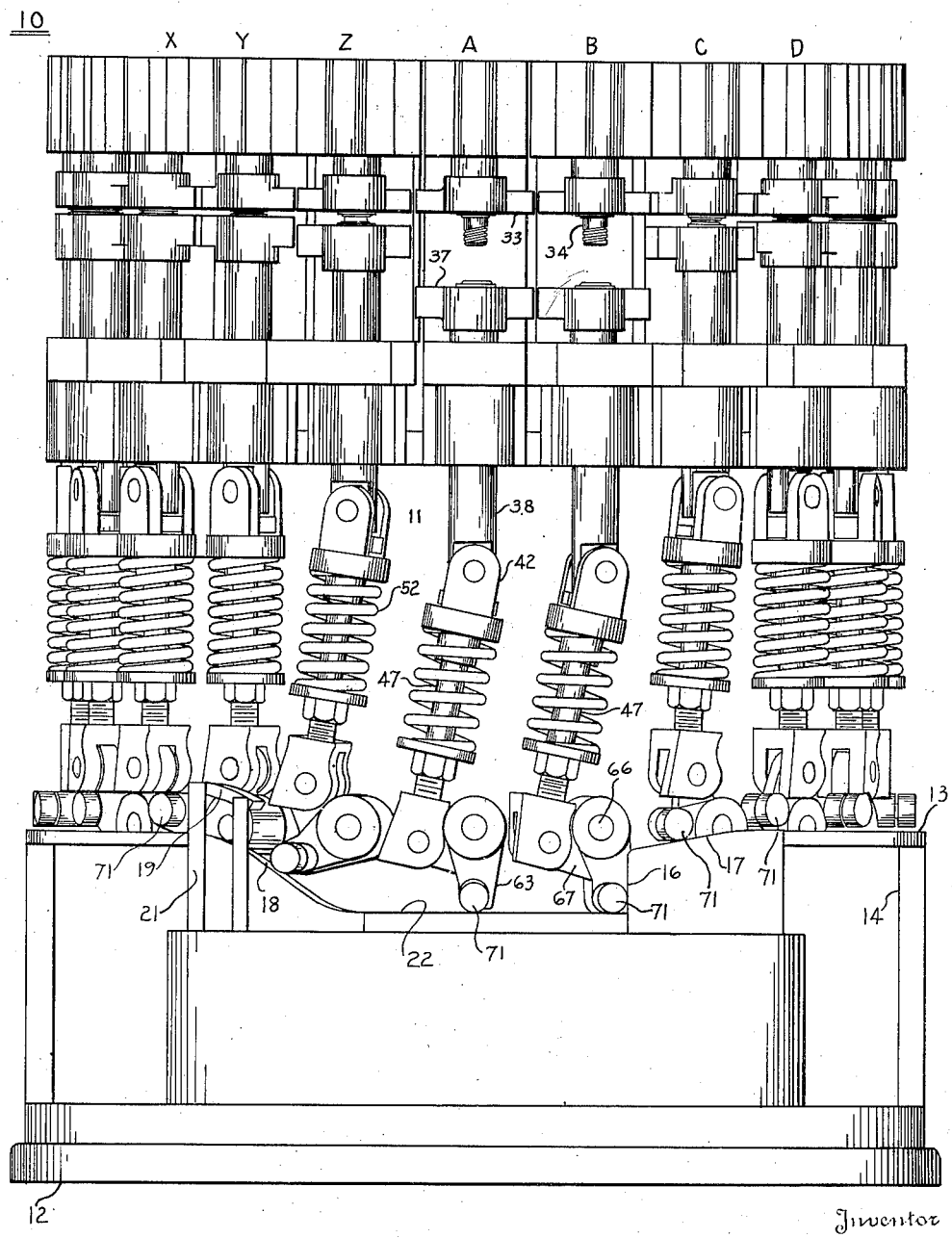

Referring more particularly to Fig. 1 of the drawings, the reference numeral 10 is employed to generally designate one form of a turret type press with which the present embodiment of the invention is associated. This press comprises two distinct parts, namely a turret 11 and a base 12. The turret 11 is preferably mounted in any well known manner on a center support carried by the base 12, and suitable mechanism is provided for the purpose of rotating the turret at any desired constant speed. For purposes of the present invention, it may be assumed that the means employed to rotate the turret is set to operate at a speed consistent with a molding cycle for molding pieces of the nature herein set out.

The base 12 includes a circumferential track 13 which, in the present showing, is supported on the pedestal portion of the base by uprights 14. This track is in a horizontal plane throughout a substantial portion of its length, the only break in this being at the front of the machine, as shown in Figs. 1 and 10 of the drawings. For a clearer understanding of this structure, the molding cycle is indicated as commencing with the vertical portion 16 and inclined portion 17 of the track 13. On the completion of the molding cycle, the track 13 inclines downwardly, as indicated at 18, and throughout a part of the length of this incline an upper guard 19 is provided, being supported in any suitable manner, as by parts 21. Between the end of the incline 18 and the vertical portion 16, the track continues along a horizontal plane 22, substantially as shown. The portion 22 of the track represents a time period between the end of a cycle and the beginning of another cycle and is sufficient to permit ejecting a molded piece and refilling the mold cavity preparatory to molding another piece.

The turret 11 shown includes an upper horizontal portion 23, on which is located a plurality of radially disposed brackets or mold element supports 24. These supports, in the present disclosure, include portions 26 adapted to be mounted on and secured to the horizontal portion 23 of the turret. The supports extend laterally beyond the turret 11 and each includes a horizontal offset 27 that is spaced from and beneath a further offset 28. The space between these offsets is sufficient to contain both elements of a mold in sufficiently spaced relationship to permit insertion of plastic material into the cavity of one element and the removal of a finished molded piece. The offset 27, since it must align and support the movable element of the mold, may be reinforced substantially as shown. The upper offset 28 is formed with a vertically directed semi-circular recess and a correspondingly recessed front plate 29 is secured to the front of the offset 28 by studs 31. Mounted in the aperture thus formed is the shaft portion of an element 32 of the mold. This element, as may be seen in the drawing, is fixed against movement, through support 24, to the turret 11 and includes a generally circular seat portion 33 from which depends a force 34. Since the present illustration of the invention depicts mechanism set up to mold internally threaded bottle caps, the force 34 is of the diameter of the inside of a bottle cap and includes threads 36.

The movable element 37 of the mold is, of course, formed with an upwardly opening cavity that, in the present instance, is of a size to receive either plastic powder or pellets, together with the force 34. This element of the mold is mounted on a shaft 38 that projects downwardly through the supporting offset 27. The lower end of this shaft terminates in a flat end portion 39, through which a transverse opening is made. A yoke 41 is pivotally joined along its arms 42 to the end 39 of the shaft by a pin 43. The base of this yoke includes an offset annular shoulder 44 and a downwardly extending collar 46. A suitable opening is made vertically through the yoke, being adapted to receive a rod 47. The upper end of this rod is formed with a head 48 that is located between the arms 42. The rod is thus secured against removal from the yoke in one direction by engagement of the head 48 with the shoulder 44, substantially as indicated in Figs. 6 and 8 of the drawing. Adjacent its other end, the rod 47 is formed with a threaded area 49 and terminates in a reduced diametered portion 51. Enclosing the rod is a coiled compression spring 52. This spring is of an inside diameter to allow its upper coil to receive the depending collar 46 of the yoke, the under edge of the shoulder 44 constituting a coil seat. Mounted on the rod 47, adjacent its other end, is a collar 53 having a seat 54 for engagement with the lowermost coil of the spring 52. The collar 53 is held in place by a nut 56 engaged with the threaded area 49. The tension of spring 52 may be varied as required by adjustment of the nut 56 over the extensive threaded area 49. Sufficient space is, of course, provided between the upper surface of head 48 and the lower edge of end portion 39 to assure full use of the spring as the force by which to close the mold elements and hold them in closed position under predetermined pressure during a molding cycle.

The end portion 51 projects into the base portion of a downwardly opening yoke 55. These parts are held against relative movement in any suitable manner, as through the use of a tapered drive pin 57, shown in Fig. 9. The arms 58 of the yoke 55 terminate at their lower edges in flat areas or seats 59. As may be seen in Figs. 2 and 4 of the drawings, corresponding side edges of the arms provide an arcuate recessed area 61 and a rounded portion 62, this latter portion blending into the seat 59. A member 63 is adapted to have connection with the yoke 55. This member includes a substantially cylindrical portion 64, having a transverse opening in which to receive the end of a pin 66. This pin is of substantial proportions and is carried by the turret (see Fig. 5). Extending from the portion 64 is an arm 67 which has an opening therethrough adapted to register with the openings 60 of the yoke 55 for the purpose of pivotally joining these parts by a pin 68. At slightly less than right angles to the arm 67 and offset laterally therefrom, substantially as suggested in Fig. 5, is a further arm 69. This arm mounts a roller 71 which is adapted to contact the track 13 and guard 19.

For a clearer understanding, a complete cycle of operation of the mechanism of the invention is set out as follows:

Starting with the molding unit, indicated at A in Fig. 1 of the drawings, it will be noted that the molding elements 33 and 37 thereof are in fully opened position. Also, that the rod 47, connected by yoke 42 to shaft 38, is inclined to the direction of travel of this shaft, and that the member 63 is so positioned that the roller 71 rests on the horizontal portion 22 of the track.

As the turret 11 revolves, molding unit A moves to the position of unit B (Fig. 1). During this movement, plastic material, in any desired form, has been admitted to the cavity of the mold element 37. In the position of unit B, the roller 71 contacts the vertical portion 16 of the track. However, in all other respects the parts connected with the movable mold element 37 remain the same as shown for unit A. Continued movement of the turret causes roller 71 to move upwardly of the portion 16 and member 63 to revolve about its pivotal connection 66 with the turret. This movement of the member, through arm 67, forces rod 47 upwardly. When the roller moves off the vertical portion 16 onto the inclined portion 17 of the track, it will be observed by referring to unit C in Fig. 1 that the elements of the mold are in nearly fully closed position and that the force 34 has moved into the plastic material now contained in the cavity of the element 37. Since rotation of the member 63 about its fixed pivot 66 moves the mold element 37, further rotation of this member, by movement of the roller 71 up the incline 17, brings the operative parts of the unit into the position shown more clearly in Fig. 3 of the drawing. In this position, it will be observed that pins 68 and 66 are on a common vertical center line and that the spring 52 has been compressed to an extent to bring the mold elements into fully closed position. It will be understood that the showing of Fig. 3 of the drawings is a position of the parts intermediate the showing of units C and D in Fig. 1. As the roller 71 moves up the last portion of the incline 17 of the track, the member 63 rotates to a position such that the rod 47 and attached parts swing past the dead center of Fig. 3 into the offset position of Fig. 4. This movement can only continue to a position such that the upper edge of arm 69 abuts the seat or surface 59 of the yoke 55. The spring, of course, has a tendency to expand from its previously compressed position, after dead center has been passed, and this urges arm 69 against and holds it in contact with seat 59. In this position, shown as unit D of Fig. 1, the roller 71 is now slightly elevated from the horizontal portion of the track 13 and the mold elements are maintained in proper pressure relationship. It might well be pointed out that proper distribution of the material in the cavity may better be obtained by application of greater pressure as between the mold elements than is normally required during a period of molding. In the present structure this is accomplished through compression of the spring 52 to the position of Fig. 3 and subsequently slightly relieving this compression when the member 63 passes dead center and assumes the position of Fig. 4.

Further rotation of the turret 11 in no way alters the relative position of the mold elements since they are now held in pressure abutment solely by the spring 52. As heretofore mentioned, the spring has been adjusted to produce the desired pressure of the mold elements during a molding cycle. The track 13, although extending around the rear of the machine, serves no purpose with respect to the rollers 71 of the molding units other than to prevent full separation of the mold elements under action of the spring 52 should some part of the mechanism become out of order or damaged.

As the molding units move around with the turret toward the front of the machine, means is provided by which to open the molds preparatory to ejection of the molded pieces. To illustrate, the operative parts of unit X in Fig. 1 are in identical position with respect to the parts of unit D. However, as the turret revolves, unit X moves to the position indicated by unit Y and in so doing the suspended roller 71 contacts the under surface of the inclined guard 19. Since the roller must travel down this incline, it causes the member 63 to rotate from the off center position of Fig. 4, through the dead center position of Fig. 3, and into the position shown in unit Y. Herein the expanding action of the spring 52 has rotated the member 63 to cause the roller 71 to contact the inclined portion 18 of the track. During this movement of the operative parts of the unit, the element 37 of the mold is only freed from its pressure contact with element 33 to the extent that the compression of the spring is relieved. Consequently, continued rotation of the turret brings the parts into the position shown in unit Z in Fig. 1. Herein the roller 71 has dropped rapidly down the steep incline 18 of the track and, with continued movement of the turret, the parts of the mechanism are again in the position shown in unit A, at which time the exposed molded piece is removed in any desired manner.

Although applicant has shown and described only one specific form of a mechanism for controlling relative movement of the elements of a mold in an automatic sequentially operated press, it will be understood that modifications or variations of the structure shown and described may be made and are contemplated insofar as they are within the spirit and scope of the invention as set out in the annexed claims.

Having thus set forth my invention, what I claim as new and for which I desire protection by Letters Patent is:

1. In a molding machine having a rotatable turret, a plurality of molds carried by said turret, each of said molds including a pair of complemental elements, one of said elements being fixed, the other of said elements being movable with respect to the fixed element and said turret, mechanism for operating the movable element of each of said molds comprising a toggle, means connecting said toggle with said movable element, a spring associated with said toggle, a cam-like track on a stationary part of said machine, said track having at least one area engageable by said toggle in a manner to effect movement of said movable element into closed position with respect to said fixed element, said toggle, spring and means being so constructed and arranged as to lock said movable element in closed position independently of said track.

2. In a molding machine having a rotatable turret, a plurality of molds carried by said turret, each of said molds including a pair of complemental elements, one of said elements being fixed, the other of said elements being movable with respect to the fixed element and said turret, mechanism for operating the movable element of each of said molds comprising a spring pressure unit joined to each movable element, a cam-like track on a stationary part of said machine, a toggle pivotally mounted on said turret and joined to said spring pressure unit, said toggle being engageable with a portion of said track in a manner to impart movement in one direction thereof to said movable element through said spring pressure unit to bring said movable element into cooperative relationship with said fixed element, said toggle and said spring pressure unit being so constructed and arranged as to secure said movable element against withdrawal from said fixed element independently of said track during at least part of a molding cycle, and means associated with said track for rotating said toggle in another direction to permit withdrawal of said movable element from said fixed element under impulse of said spring pressure unit.

3. In a molding machine having a rotatable turret, a plurality of molds carried by said turret, each of said molds including a pair of complemental elements, one of said elements being fixed, the other of said elements being movable with respect to the fixed element and said turret, mechanism for reciprocating the movable element of each of said molds comprising a toggle, extensible means connecting each toggle with a movable element, a spring normally acting to fully extend said extensible means, and other means operable, during rotation of said turret, to move said toggle in a manner to successively cause closing of said mold by said extensible means, and cause said spring, independently of said other means to secure said mold in closed position.

4. In a molding machine having a rotatable turret, a plurality of molds carried by said turret, each of said molds including a pair of complemental elements, one of said elements being fixed, the other of said elements being movable with respect to the fixed element and said turret, mechanism for reciprocating the movable element of each of said molds comprising a toggle, extensible means connecting each toggle with a movable element, a spring normally acting to fully extend said extensible means, and other means, operable, during rotation of said turret, to successively actuate each toggle to an extent to cause said spring, independently of said other means, to further actuate said toggle to effect fully closing said mold.

5. In a molding machine having a rotatable turret, a plurality of molds carried by said turret, each of said molds comprising relatively separable cooperative elements, a toggle for each of said molds carried by said turret, spring means connecting said toggle with one of said elements, and means operable, during rotation of said turret, to successively engage and move each toggle to a position such that said spring means, independently of said last-named means, acts to urge further movement of said toggle in a direction to effect separation of said elements.

6. In a molding machine having a rotatable turret, a plurality of molding units carried by said turret, each of said molding units comprising relatively movable cooperative elements, a toggle for each of said units carried by said turret, spring means connecting said toggle with said movable element, and means to move said toggle to a position such that said spring means independently of said last means acts on said toggle and movable element to maintain the elements of said mold in a predetermined pressure engaging relationship.

7. In a molding machine having a rotatable turret, a plurality of molding units carried by said turret, each of said molding units comprising relatively separable cooperative elements, a toggle for each of said units carried by said turret, spring means connecting said toggle with one of said elements, and means on a fixed portion of said machine operable, during rotation of said turret, to move said toggle to a position such that said spring means independently of said last means cooperates with said toggle to effect opening of said mold.

8. In a molding machine having a rotatable turret, a molding unit carried by said turret, said unit comprising relatively movable cooperative elements, mechanism for moving one of said elements in a direction to close said unit comprising a toggle carried by said turret, spring means connecting said toggle with the movable element of said unit, and means on a fixed portion of said machine engageable with and adapted to actuate said toggle, said toggle and said spring means being so constructed and arranged as to lock the elements of said unit in closed position independently of the fixed means.

DAVID CROPP.

REFERENCES CITED

The following references are of record in the file of this patent:

UNITED STATES PATENTS

| Number | Name | Date |
| --- | --- | --- |
| 647,732 | Wallace | Apr. 17, 1900 |
| 1,965,732 | Bisterfeld | July 10, 1934 |
| 2,058,880 | Hunt | Oct. 27, 1936 |
| 2,304,141 | Bergmann | Dec. 8, 1942 |
| 2,354,029 | Kingston | July 18, 1944 |
| 2,389,561 | Stokes et al. | Nov. 20, 1945 |